(12) United States Patent
Purvis (10) Patent No.: US 10,135,323 B2
(45) Date of Patent: Nov. 20, 2018

(54) CAPACITIVE-DISCHARGE ELECTROMAGNETIC PROPULSION SYSTEM

(71) Applicant: James Wayne Purvis, Albuquerque, NM (US)

(72) Inventor: James Wayne Purvis, Albuquerque, NM (US)

( * ) Notice: Subject to any disclaimer, the term of this patent is extended or adjusted under 35 U.S.C. 154(b) by 208 days.

(21) Appl. No.: 15/064,401

(22) Filed: Mar. 8, 2016

(65) Prior Publication Data

US 2017/0264181 A1 Sep. 14, 2017

(51) Int. Cl.
*H02K 41/02* (2006.01)
*F03H 99/00* (2009.01)

(52) U.S. Cl.
CPC ............. *H02K 41/02* (2013.01); *F03H 99/00* (2013.01); *H02K 2207/00* (2013.01)

(58) Field of Classification Search
CPC ... F25D 29/005; F25D 2700/12; G01K 7/427; G01K 13/00; G01K 2207/04; F28F 27/00; Y10T 29/4935; F25B 49/02; F25B 49/005; F25B 2700/2104; H02K 41/02; H02K 2207/00; F03H 99/00
See application file for complete search history.

(56) References Cited

U.S. PATENT DOCUMENTS

| | | |
|---|---|---|
| 2,949,550 A | 8/1960 | Brown |
| 2,958,790 A | 11/1960 | Bahnson |
| 3,018,394 A | 1/1962 | Brown |
| 3,187,206 A | 6/1965 | Brown |
| 3,223,038 A | 12/1965 | Bahnson |
| 3,227,901 A | 1/1966 | Bahnson |
| 3,626,605 A | 12/1971 | Wallace |
| 4,663,932 A * | 5/1987 | Cox .................. F03H 99/00 313/359.1 |
| 4,795,113 A * | 1/1989 | Minovitch ........... B64G 1/14 104/138.1 |
| 5,142,861 A | 9/1992 | Schlicher et al. |
| 5,182,958 A | 2/1993 | Black |
| 5,197,279 A | 3/1993 | Taylor |

(Continued)

FOREIGN PATENT DOCUMENTS

| | | |
|---|---|---|
| GB | 2229865 | 10/1990 |
| GB | 2334761 | 9/1999 |

(Continued)

OTHER PUBLICATIONS

NASA, "Breakthrough Propulsion Project, Workshop Proceedings", NASA TM/1998-208400, pp. 4-9,1998.

(Continued)

*Primary Examiner* — Michael C Zarroli (57) ABSTRACT

The present invention discloses an apparatus and method for electromagnetic spacecraft propulsion. The apparatus includes capacitor assemblies bracketed by electromagnetic solenoids configured in Helmholtz Coil geometries. The action of magnetic fields generated in the solenoids on segmented currents in conductive discharge elements during capacitor discharge produces unidirectional forces, while reaction momentum is carried away by Poynting Vector electromagnetic fields in conformity with the currently understood principles of electrodynamics.

7 Claims, 4 Drawing Sheets

(56) References Cited

U.S. PATENT DOCUMENTS

| | | | |
|---|---|---|---|
| 5,207,760 A * | 5/1993 | Dailey | G21D 5/02 |
| | | | 315/111.81 |
| 5,280,864 A | 1/1994 | Woodward | |
| 5,377,936 A | 1/1995 | Mitchell | |
| 2,886,976 A | 5/1995 | Dean | |
| 6,098,924 A | 8/2000 | Woodward | |
| 6,208,497 B1 * | 3/2001 | Seale | F01L 9/04 |
| | | | 361/154 |
| 6,317,310 B1 | 11/2001 | Campbell | |
| 6,347,766 B1 | 2/2002 | Woodward | |
| 6,404,089 B1 * | 6/2002 | Tomion | B64C 39/001 |
| | | | 244/23 A |
| 6,411,493 B2 | 6/2002 | Campbell | |
| 6,492,784 B1 | 12/2002 | Serrano | |
| 6,775,123 B1 | 8/2004 | Campbell | |
| 7,913,954 B2 | 3/2011 | Levin | |
| 8,022,775 B2 * | 9/2011 | Julstrom | H02J 7/025 |
| | | | 331/25 |
| 8,066,226 B2 | 11/2011 | Fiala et al. | |
| 8,575,790 B1 | 11/2013 | Ogilvie | |
| 9,287,840 B1 * | 3/2016 | Woodward | H03F 7/00 |
| 9,712,031 B2 * | 7/2017 | Ensle | H02K 41/025 |
| 2006/0065789 A1 * | 3/2006 | Woodward | B64G 1/409 |
| | | | 244/171.5 |

2014/0013724 A1    1/2014  Fetta

FOREIGN PATENT DOCUMENTS

| GB | 2399601 | 9/2004 |
|---|---|---|
| GB | 2537119 | 10/2016 |

OTHER PUBLICATIONS

Purvis, J.W., "Unidirectional Lorentz Force on Rectangular Coil-Current Segment System", Private Communication, 2017.

Stafford, Thomas P., "America at the Threshold: Report of the Synthesis Group on America's Space Exploration Initiative",1991, pp. 64-68,NASA.

NASA, "Breakthrough Propulsion Project, Workshop Proceedings", NADA TM/1998-208400, pp. 4-9, 1998.

Resnick, D., and Halliday, R., "Physics, Parts I and II", pp. 986, 995-998., John Wiley & Sons, 1967.

Sebens, C.T., "Forces on Fields", arXiv:1707.04198 [physics.hist-ph], pp. 1-21, 2017.

Cullwick, E.G., Nature, vol. 470, No. 125, 1952.

White, Harold et.al.,AIAA Journal of Propulsion and Power, vol. 33, No. 4, pp. 830-841.

Feynman, R.P., et.al.,The Feynman Lectures on Physics, vol. II, Ch. 26-2, 1997.

* cited by examiner

CAPACITIVE-DISCHARGE ELECTROMAGNETIC PROPULSION SYSTEM

FIELD OF THE INVENTION

The present invention discloses an apparatus and method for electromagnetic spacecraft propulsion. In particular, thrust is generated without the expulsion of reaction mass. This unique system and method is comprised of capacitor assemblies with discharge elements and electromagnetic coils. A unidirectional Lorentz Force is generated by the magnetic fields from the coils acting on the segmented current in the discharge element during capacitor discharge.

BACKGROUND OF THE INVENTION

One of the most significant metrics for space propulsion systems is specific impulse, which is the ratio of thrust produced to the rate of propellant consumed. Specific impulse has units of seconds, and is essentially the number of seconds that a pound of propellant will produce a pound of thrust. The higher the specific impulse the less propellant mass and associated tankage required for a given space mission. The Stafford Synthesis Group (Stafford, *America at the Threshold*) concluded that future space exploration will require advanced propulsion technologies. Subsequently, NASA conducted the *Breakthrough Propulsion Physics Program* (NASA/TM-1998-208400), one of the three main goals of which was to "discover new propulsion methods that eliminate or dramatically reduce the need for propellant. This implies discovering fundamentally new ways to create motion, presumably by manipulating inertia, gravity, or by any other interactions between matter, fields, and space-time." Therefore, an electromagnetic spacecraft propulsion system such as the present invention, that does not require expendable propellant and thus has an effectively infinite specific impulse, would address these needs and greatly reduce the cost of doing business in space.

Sir Isaac Newton's well-known Third Law of Motion, which states "To every action there is always an opposed equal reaction; or, the mutual actions of two bodies upon each other are always equal and directed to contrary parts", has been interpreted as all-encompassing for over three hundred years. The Newtonian interpretation excluded the possibility of "reactionless propulsion" of a solid body. However, the discovery of electricity and magnetism, the new branch of electrodynamics resulting from Maxwell's Equations, and the subsequent rise of relativistic electrodynamics and quantum electrodynamics, led to a new interpretation of the famous "Third Law of Motion".

One of the important characteristics of an electromagnetic (EM) wave is that it can transport energy from point to point. The rate of energy flow per unit area in a plane electromagnetic wave is described by the Poynting Vector S, defined as the cross-product of the instantaneous E-field and B-field comprising the EM wave. The direction of S gives the direction in which the energy moves. (Resnik and Halliday, *Physics Parts I and II*). Less familiar is the fact that EM waves also transport linear momentum. Just as Poincare noted in 1900, Stebens explains that the electromagnetic field closely resembles a relativistic fluid, composed of quantum particles (photons), which transmits properties and responds to forces in much the same way as an Eulerian fluid (Stebens, *Forces on Fields*). In electromagnetism, as in Newton's solid body mechanics, the force on matter from the electromagnetic field is balanced by an equal and opposite force from matter on the field. Stebens presents an excellent proof which can be derived from Maxwell's equations and the Lorentz force law. The proof relates the reaction momentum change of the electromagnetic field to the time rate of change of the Poynting Vector, the divergence of the Maxwell Stress Tensor, and Einstein's relativistic mass-energy relation (*Forces and Fields*, op.cit.). Straightforward application of the Biot-Savart Law from classical physics shows that the magnetic field from a rectangular conducting coil acting on an isolated current segment generates a unidirectional force on the coil-segment system. By recognizing that electromagnetic fields can transport both energy and momentum, apparent "violations" of the Third Law are mathematically resolved by including modern field transport physics in the analysis of the reaction process.

Field propulsion, which employs electromagnetic field effects for generating propulsion forces, expels no reaction mass, and therefore effectively has an infinite specific impulse. As is well known to anyone skilled in the art, a moving charged particle generates a magnetic field. It is also well known that a magnetic field generates a force on a moving charged particle, namely the magnetic component of the full Lorentz Force, which component is proportional to the vector cross-product of the particle velocity vector and the magnetic field vector at the particle location. A common example is the well-known mutual equal-and-opposite forces on parallel conductors, which may be calculated by anyone skilled in the art through the use of the Biot-Savart Law. Prior to modern electrodynamics, the required compliance with Newton's Third Law (NTL), it has previously been accepted that the aforementioned magnetic interactions could not be used to produce a propellantless propulsion system. As discussed above, modern electrodynamics has shown that this is no longer a valid assumption.

Physicists have known since at least 1952 that apparent violations of NTL, in cases where force interactions involve charged particles and electromagnetic fields, simply do not account for the momentum carried in the fields themselves. As noted by Cullwick over sixty years ago: "The following simple relations between electromagnetic momentum, the Poynting vector for energy transport, and mass-energy equivalence do not appear to have received general recognition in connection with the validity of Newton's Third Law when applied to electromagnetic forces (Cullwick, *Nature*)." Since then, over thirty US patents and at least two dozen foreign patents have been issued for propellantless propulsion devices. Most importantly, recent experimental investigations conducted by NASA with an EM drive device (White, *AIAA Journal of Propulsion and Power*) have definitively confirmed that EM field propulsion is a reality.

Nobel Laureate Richard Feynman (*The Feynman Lectures on Physics*), among others, noted that the magnetic interaction between two charged particles moving orthogonally to each other apparently does not satisfy NTL in classical Newtonian dynamics. But, as Feynman explains (*Lectures*, op.cit.), if the changing momentum of the electromagnetic fields of the two particles is included, then overall momentum is conserved. Engineering exploitation of this situation, to date, has not been effected due to the "circuit completion" problem. While isolated moving charges may apparently violate NTL, when they are confined as part of a complete closed circuit, then by application of Gauss' Law the net forces on each circuit are found to be equal and opposite in accordance with NTL.

RELATED ART FOR ELECTROMAGNETIC PROPULSION

Table 1 presents a comparison of experimental results for several propellantless propulsion devices. Through an electrokinetic phenomenon termed the Biefeld-Brown Effect, electrical energy input into asymmetrical capacitors can be converted to mechanical energy which then provides a force for propelling an object. T. T. Brown, a co-discoverer of the Biefeld-Brown Effect, has been issued U.S. Pat. No. 2,949,550, No. 3,018,394, and No. 3,187,206 for devices based on utilization of the effect. Townsend's colleague A. H. Bahnson has similarly been issued U.S. Pat. No. 2,958,790, No. 3,223,038, and No. 3,227,901 utilizing the effect. NASA is still investigating the use of Brown's discovery, as disclosed in U.S. Pat. No. 6,317,310, No. 6,411,493, and No. 6,775,123 to Campbell (assigned to NASA). Another such device is disclosed in U.S. Pat. No. 6,492,784 to Serrano, which generates the Biefeld-Brown Effect using stacked-disc asymmetrical capacitors. Debate is ongoing in the literature as to whether the Biefeld-Brown Effect will work in the vacuum of space. Another limitation to using the effect may be the scalability potential, since asymmetrical capacitor devices to date have only generated tens of milli-newtons of thrust from tens of watts of input power.

TABLE 2

| Device | Thrust (mN) | Power (kW) | Isp (sec) | propellant |
|---|---|---|---|---|
| Biefeld-Brown Effect | 0.05 | 0.035 | Infinite | none |
| Fetta-Cannae Drive | 0.01 | 0.0105 | Infinite | none |
| NASA-EM test | 0.09 | 0.017 | Infinite | none |
| China-EM | 720 | 2.5 | Infinite | None |
| Woodward (2016) | 0.007 | 0.100 | Infinite | None |

Electrodynamic structures, as disclosed in U.S. Pat. No. 7,913,954 to Levin, include a power system, a plurality of collectors, a plurality of emitters, and conductive paths for moving payloads through the Earth's magnetic field. An inertial propulsion device, as disclosed in U.S. Pat. No. 8,066,226 to Fiala, utilizes several interconnected gyroscopic elements and Earth's gravity field to move without propellant. U.S. Pat. No. 5,377,936 to Mitchell, discloses a method for using the electromagnetic spectrum particles which continually irradiate the earth from space for gravity guidance and propulsion of geosynchronous satellites, and other satellites and space vehicles within the gravitational influence of the earth. The superconducting electromagnetic turbine, as disclosed in U.S. Pat. No. 8,575,790 to Ogilvie, uses a pair of counter-rotating electrodynamic superconductor rotors to displace the surrounding geomagnetic field. These devices do not have general space-based utility since they are restricted to operations within either the gravity field or the magnetic field of Earth.

Other approaches to propellantless propulsion include mechanical devices such as U.S. Pat. No. 2,886,976 to Dean, which discloses a device for converting rotary motion into unidirectional motion. Similarly, U.S. Pat. No. 5,182,958 to Black discloses a mechanical device with wheels inside comprising both a nonlinear propulsion as well as an energy conversion system. A device for propellantless propulsion using radiated electromagnetic fields is disclosed in U.S. Pat. No. 5,142,861 to Schlicher et al., comprising an electromagnetic propulsion system based on an extremely low frequency radiating antenna structure driven by a matched high current pulsed power supply. U.S. Pat. No. 5,197,279 to Taylor also discloses an engine for imparting momentum to a vehicle by generating and transmitting in predetermined directions massive quantities of electromagnetic field energy in successive pulses.

The most current example of a propellantless field propulsion system is an electromagnetic drive system as disclosed in British Patents GB2229865, GB2334761, GB2399601 and UK Patent Application GB2537119 to Shawyer, as well as U.S. Pat. Appl. No. 20140013724 to Fetta. This system includes an axially-asymmetric resonant cavity with a conductive inner surface adapted to support a standing electromagnetic (EM) wave. The resonating cavity lacks second-axis axial symmetry, thereby causing the standing EM wave to induce a net unidirectional force on the resonant cavity, thus generating thrust without reaction mass. Experimental versions of these EM devices have reportedly produced thrust levels of micro-newtons up to milli-newtons from several kilowatts of input power (*AIAA Journal of Propulsion and Power*, op.cit.), as noted in Table 1.

Field modification approaches to propellantless propulsion include apparent reductions in gravitational mass or inertial mass. U.S. Pat. No. 3,626,605 to Wallace discloses a method and apparatus for generating a time-variant non-electromagnetic force field due to the relative motion of moving bodies constituted of elements whose nuclei have half integral "spin" values, with said force field exhibiting itself in the form of an induced secondary gravitational force. U.S. Pat. No. 5,280,864 to Woodward in 1994 discloses a method for producing transient fluctuations in the inertial masses of material objects by employing an effect that is a consequence of relativistic theories of gravitation. This patent is a continuation in part of application Ser. No. 07/521,992 filed in 1990 as C.I.P. of application Ser. No. 07/031,157 filed in 1987 as C.I.P of application 6/919,647 filed in 1986, now all abandoned. The patent basically uses high frequency vibrating piezoelectric force transducers to accelerate a capacitor array while applying high frequency AC to electrically oscillate ions in the dielectrics. The relativistic Mach Effect was predicted to produce unidirectional forces.

In subsequent U.S. Pat. No. 6,098,924, No. 6,347,766 and No. 9,287,840, Woodward disclosed various improvements to the device of U.S. Pat. No. 5,280,864 for producing propellantless thrust by using piezoelectric force transducers attached to resonant mechanical structures, in accordance with Mach's principle and local Lorentz-invariance predictions of transient rest mass fluctuations in accelerated objects. The device was designated the "Mach Effect Thruster". The latest U.S. Pat. No. 9,287,840 in 2016 incorporates acceleration and temperature feedback sensors in the electronics control system, uses a DC bias voltage superimposed on the high frequency the AC voltages to activate transducers, and applies pulsed AC waveforms. With these improvements, the device produces 6-7 micronewtons of thrust with a 100 W power input, which is approximately 14 megawatts/Nt. The disclosure admits that the device is not scalable and that arrays of multiple small devices will be necessary to generate larger thrusts.

In U.S. Application 2006/0065789, Woodward introduced his "flux capacitor" which proposed modifications to the devices of U.S. Pat. No. 5,280,864, No. 6,098,924, No. 6,347,766 to overcome a serious internal propagation speed problem. The force transducers were eliminated, and the capacitor arrays were either enclosed within induction coils or external induction coils were aligned with axes perpendicular to the displacement fields in the capacitor. The objective was to replace transducer accelerations by using induction coils to generate perpendicular magnetic field oscillations of the dielectric ions. The patent never issued.

SUMMARY OF THE INVENTION

The current disclosure presents a novel and improved apparatus for electromagnetic spacecraft propulsion which does not require expendable propellant and requires only electrical power. The basic principle of said apparatus is to produce a current segment which is not part of a continuous closed circuit Constant strength magnetic fields from Helmholtz Coil pairs of electromagnetic solenoids act on the current segment, said current segment being in a discharge element, which is a discharge path between two oppositely-charged capacitor plates. The field-current interactions occur in the well-known Lorentz Force qV×B geometric manner so as to produce a unidirectional Lorentz Force, with reaction momentum being carried away by Poynting Vector fields in accordance with electrodynamics principles. Embodiments of the present invention are novel in that they generate thrust without the use of reaction mass or propellant, and do so in a manner distinct from the devices and methods of Brown, Campbell, Serrano, Fetta, Woodward and others as mentioned previously.

BRIEF DESCRIPTION OF THE DRAWINGS

The accompanying drawings, which are incorporated in and form part of the specification, illustrate various principles of operation and examples of the present invention, including a preferred embodiment of the invention, as well as alternate embodiments, and, together with the detailed description, serve to explain the principles of the invention.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
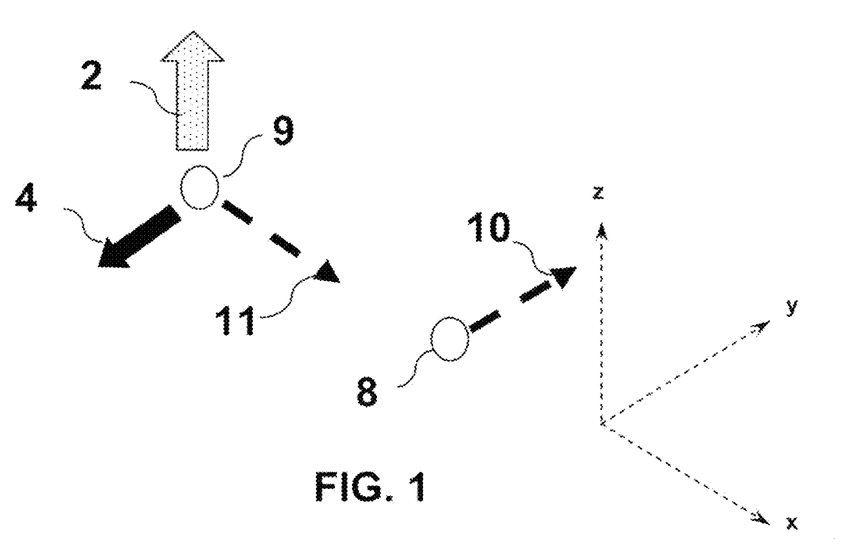
FIG. 1 is a schematic diagram illustrating the unbalanced Lorentz Force acting on charged particles moving orthogonally in the same plane.

By way of further background, the situation presented in FIG. 1 is also well known to those skilled in the art and familiar with the works of Feynman. The figure illustrates two positively charged coplanar particles 8 and 9 moving with respective orthogonal velocities 10 and 11, with velocity vector 10 being parallel to the y-axis of the coordinate system shown, and velocity vector 11 being parallel to the x-axis. At the instant shown, particle 8 induces a magnetic field 2 on particle 9, while particle 9 induces no magnetic field effect on particle 8. As a result, a Lorentz Force component 4 acts on particle 9, while no similar force acts on particle 8. This unique situation has been noted in the literature as an apparent violation of Newton's Third Law.

Figure 2:
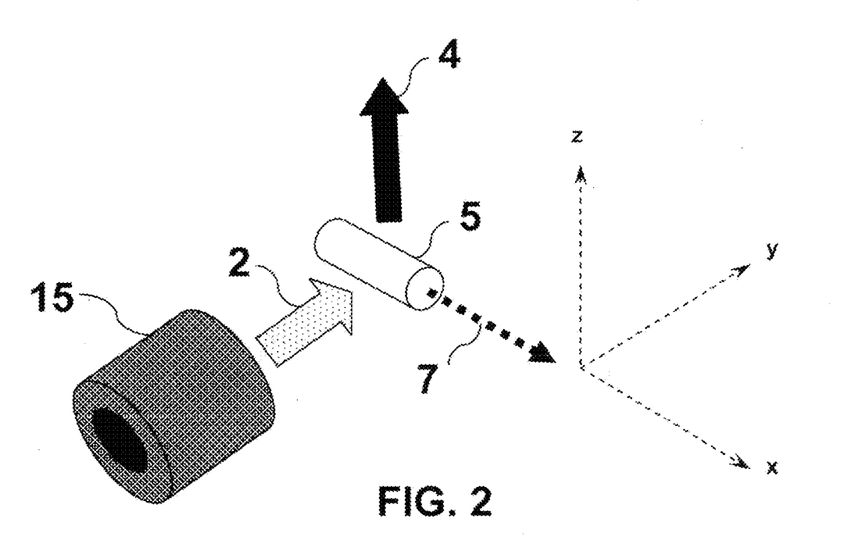
FIG. 2 is a schematic diagram illustrating the unbalanced Lorentz Force on a conductor segment due to a perpendicular magnetic field.

With reference to FIG. 2, an electromagnetic coil 15 is positioned such that the axis of symmetry of the coil is in the direction of the y-axis of the coordinate system shown. When energized, the coil 15 produces a magnetic field 2 with strongest vector component along the y-axis, which is the axis of symmetry of the coil 15. A current segment 5 carrying current 7 is located parallel to the x-direction such that it is perpendicular to the axis of symmetry of the coil 15 as shown. When coil 15 is energized to produce field 2, a net unbalanced Lorentz Force 4 is induced on the system comprised of current segment 5 and coil 15. This unbalanced force arises from the fact that most individual electrons comprising the current moving in the conducting coils of the electromagnet have z-axis velocity components which are orthogonal to the x-axis velocities of each charge in the current 7. For each coil 15-current 7 electron pair wherein a z-axis velocity component exists, the situation of FIG. 1 is realized. Because the charges on the current segment 5 are a discrete packet and are not part of a continuous current loop, there is thus the net unidirectional Lorentz Force 4 realized on the system comprising the segment and coil. Comprehensive engineering calculations have verified that a net force is produced on the coil-current segment system, while reaction momentum is carried away by Poynting Vector electromagnetic fields in accordance with currently understood principles of modern physics.

Figure 3:
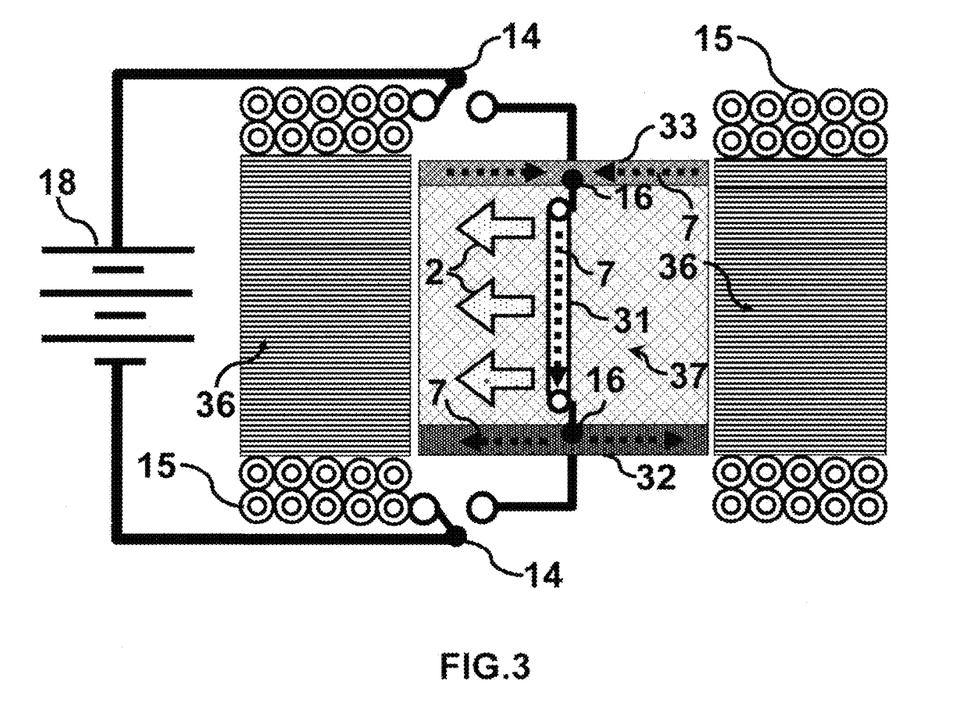
FIG. 3 presents a schematic diagram of the essential elements of the best mode of the present invention.

The essential elements of the best mode of the present invention are illustrated in FIG. 3. A solenoid comprised of conductors 15 wound on a hollow-core material 36 of high magnetic permeability completely enclosing a capacitor assembly. The capacitor assembly is comprised of two oppositely charged conductive plates 32 and 33, dielectric material 37, and discharge element 31 with associated discharge switches 16. Power source 18, which alternately both charges the capacitor assembly 32, 33, 37 and energizes the solenoid 15,36, is shown connected through closed electrical switches 14 to the solenoid assembly 15,36. The energized solenoid 15,36 generates the uniform internal magnetic field components 2 perpendicular to discharge element 31. Discharge switches 16 are shown closed with discharge current 7 flowing through the discharge element 31.

Figure 4A:
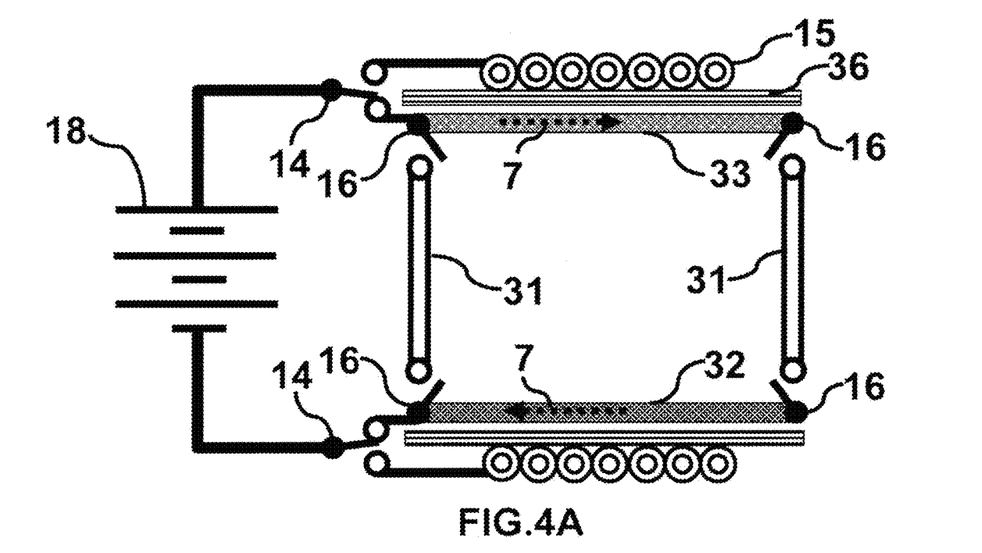
FIGS. 4A and 4B are schematic diagrams illustrating the method of operation of the present invention.
Figure 4B:
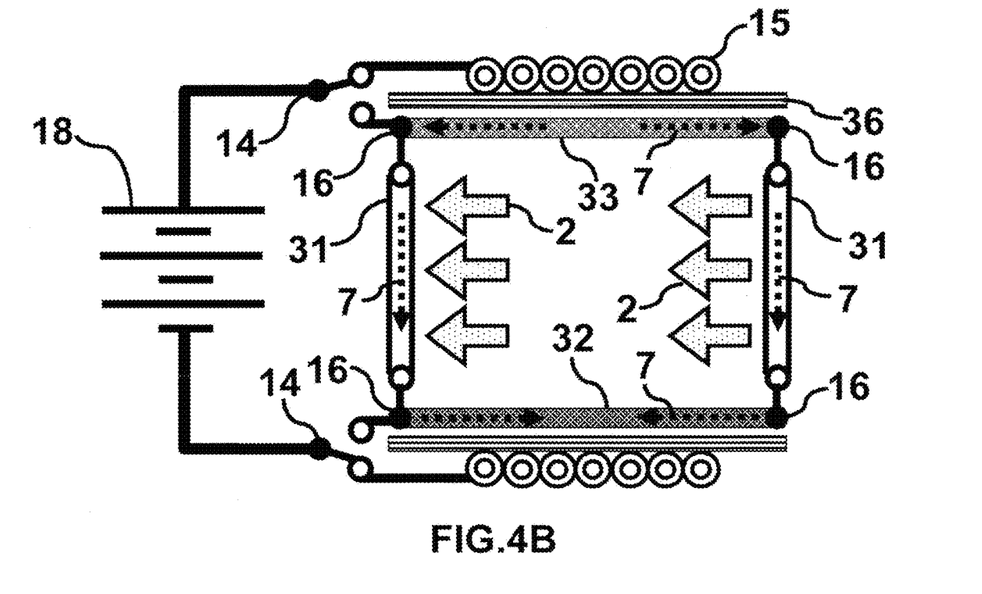

With reference to FIGS. 4A and 4B, and the elements of the invention as shown in FIG. 3, the method of using the present invention is illustrated in two steps. In FIG. 4A, opening discharge switches 16 and closing electrical switches 14 as shown connects voltage source 18 so as to oppositely charge conductive plates 32 and 33 of a capacitor assembly by means of the flow of currents 7 as shown. In FIG. 4B, electrical switches 14 are disconnected from conductive plates 32,33 and then connect voltage source 8 to solenoid coils 15, thereby generating uniform internal magnetic field 2. With internal magnetic field 2 established, closing both discharge switches 16 connects oppositely charged conductive plates 32 and 33 to discharge elements 31. Currents 7 flow along plates 32,33 parallel to magnetic field 2, producing no reaction forces. Currents 7 further flow through discharge elements 31 wherein the uniform internal magnetic field 2, perpendicular to discharge elements 31, acts on the currents 7 in said discharge elements 31 so as to result in an unbalanced Lorentz Force on the system. When elements 32,33 are sufficiently discharged, voltage source 8 is disconnected from solenoid 15,36 so that magnetic field 2 decays to zero, discharge elements 31 are disconnected from conductive plates 32,33, and the entire process is repeated as necessary. It is important to note that reversing the polarity of voltage source 8 connections to solenoid 15,36 reverses the direction of magnetic field 2 in solenoid 15,36, thereby reversing thrust.

Figure 5:
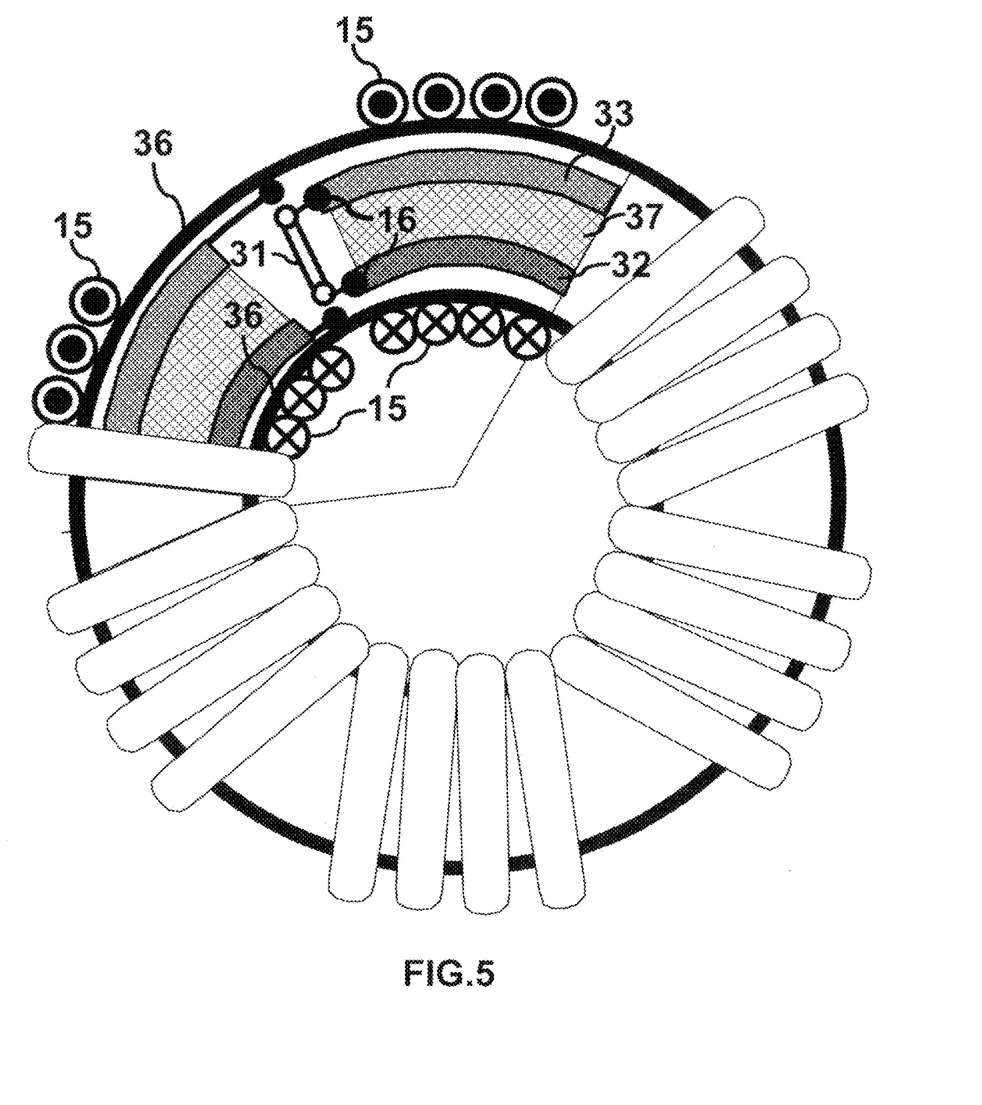
FIG. 5 is a schematic diagram illustrating a toroidal solenoid embodiment of the present invention.

With reference to FIG. 5, an interesting embodiment of the present invention is shown in partial cross-section. Conductors 15 are wound on a hollow-core 36 of high magnetic permeability material to form a toroidal solenoid assembly 15,36. Said toroidal solenoid assembly completely encloses a multiplicity of capacitor assemblies comprised of two oppositely charged conductive plates 32 and 33, dielectric material 37, and discharge element 31 with associated discharge switches 16. Energizing the toroidal solenoid configuration 15,36 generates a uniform circumferential magnetic field inside the toroid. When switches 16 connect oppositely charged elements 32 and 33 to discharge element 31, circumferential discharge currents are created in elements 32,33 and a radial discharge current is created in element 31. The said circumferential internal toroidal magnetic field is perpendicular to and acts on discharge currents in discharge elements 31 to produce Lorentz Force components parallel to the axis of symmetry of and perpendicular to the plane of the toroidal coil 15,36.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for electromagnetic spacecraft comprising:
    at least one capacitor assembly comprising two or more oppositely charged conductive plates separated by dielectrics having relative electric permittivity of at least 100;
    at least one pair of electromagnetic solenoids configured in a Helmholtz Coil geometry, each solenoid comprising electrical conductors wound on metal cores having relative magnetic permeability of at least 100;
    at least one discharge element per each said capacitor assembly, said discharge element connecting to at least two oppositely charged conductive plates;
    a multiplicity of electrical switches for connecting and disconnecting electric circuits;
    wherein the at least one discharge element and the at least one pair of electromagnetic solenoids are arranged in certain geometric configurations whereby a net unidirectional Lorentz force is created by the action of magnetic fields generated by the at least one pair of electromagnetic solenoids acting on discharge currents in the at least one discharge element during periodic discharge of the at least one capacitor assembly.

2. A method for using the apparatus of claim 1 comprising the steps of:
    a) closing electrical switches to connect a voltage source to the conductive plates of capacitor assemblies so as to charge said capacitor assemblies to a desired voltage differential;
    b) opening electrical switches so as to disconnect the said voltage source from the said conductive plates;
    c) closing electrical switches so as to connect a current source to electromagnetic solenoids so as to generate magnetic fields from said solenoids;
    d) closing electrical switches so as to discharge the conductive plates of capacitor assemblies through discharge elements;
    e) opening electrical switches to disconnect discharge elements from conductive plates so as to stop the discharging of capacitor assemblies;
    f) opening electrical switches thereby disconnecting the said current source to the electromagnetic solenoids so as to stop generation of magnetic fields from said solenoids, when continuous magnetic fields are not required;
    g) repeating steps a) through f) as desired so as to create the net unidirectional Lorentz Force of claim 1.

3. An apparatus for electromagnetic spacecraft propulsion according to claim 1, wherein the at least one discharge element per each capacitor assembly comprises an insulated electrical conductor having at least one electrical switch at each end of said conductor, and having the said electrical switches at each end separately connecting to two oppositely charged conductive plates, whereby said capacitor assemblies are periodically discharged thereby creating discharge currents in the said at least one discharge element.

4. An apparatus for electromagnetic spacecraft propulsion according to claim 1, wherein one discharge element for each capacitor assembly is located in the center of the said capacitor assembly, said discharge element being oriented in such a geometric manner that the discharge element is perpendicular to the magnetic field generated by the Helmholtz Coil configuration of the at least one pair of electromagnetic solenoids, thereby maximizing the magnetic field on the discharge element, and further providing symmetry in the discharge current paths within the charged conductive plates of the capacitor assemblies thereby minimizing the interaction of any magnetic field components normal to the conductive plates with discharge currents in the said charged conductive plates.

5. An apparatus for electromagnetic spacecraft propulsion according to claim 1, wherein two discharge elements per capacitor assembly are located one each at opposite ends of said capacitor assembly, said discharge elements being oriented perpendicular to the magnetic field generated by the Helmholtz Coil configuration of the at least one pair of electromagnetic solenoids, thereby maximizing the magnetic field acting on discharge currents in the discharge elements, providing symmetry in the discharge current paths within the charged conductive plates of the capacitor assemblies, and minimizing the interaction of any magnetic field components normal to the conductive plates with discharge currents in the said charged conductive plates.

6. An apparatus for electromagnetic spacecraft propulsion according to claim 1, wherein each solenoid of the at least one pair of electromagnetic solenoids is comprised of electrical conductors wound on a separate solid metal core, so as to facilitate configuring in Helmholtz Coil geometries for bracketing capacitor assemblies.

7. An apparatus for electromagnetic spacecraft propulsion according to claim 1, wherein the at least one pair of electromagnetic solenoids are comprised of electrical conductors wound as two separate coils on a single contiguous hollow metal core, each solenoid coil pair having spacing between adjacent coils creating successive pairs of Helmholtz Coil geometries, whereby the said hollow core completely encloses at least one capacitor assembly per each successive Helmholtz Coil pair of electromagnetic solenoids.

\* \* \* \* \*